US012770635B2

(12) United States Patent
Zhang et al.

(10) Patent No.: US 12,770,635 B2
(45) Date of Patent: Oct. 20, 2026

(54) DUAL-FILTER KALMAN METHOD FOR ACOUSTIC FEEDBACK CANCELLATION IN HANDS-FREE KARAOKE ENVIRONMENTS

(71) Applicant: Tencent America LLC, Palo Alto, CA (US)

(72) Inventors: Hao Zhang, Columbus, OH (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 164 days.

(21) Appl. No.: 18/760,813

(22) Filed: Jul. 1, 2024

(65) Prior Publication Data

US 2026/0004794 A1 Jan. 1, 2026

(51) Int. Cl.
*G10L 21/02* (2013.01)
*G10L 21/0208* (2013.01)
*G10L 21/0216* (2013.01)

(52) U.S. Cl.
CPC ..................... *G10L 21/0208* (2013.01); *G10L 2021/02163* (2013.01)

(58) Field of Classification Search
CPC ...... G10L 21/0208; G10L 2021/02163; H04R 3/02
See application file for complete search history.

(56) References Cited

U.S. PATENT DOCUMENTS

2011/0150257 A1* 6/2011 Jensen ................ H04R 25/453 381/318
2017/0213550 A1* 7/2017 Ali .......................... G10L 15/20
2019/0356984 A1* 11/2019 Anemüller ............... H04R 3/04
2020/0219524 A1* 7/2020 Braun ................. G10L 21/0232
2022/0076688 A1 3/2022 Zhang et al.
2023/0343350 A1* 10/2023 Bryan ................. G10L 21/0208
2025/0239249 A1* 7/2025 Yu .................... G10K 11/17881
2025/0273229 A1* 8/2025 Choi .................. G10L 21/0216

FOREIGN PATENT DOCUMENTS

JP 2010509829 A 3/2010
TW 201015541 A1 4/2010

OTHER PUBLICATIONS

Written Opinion of the International Searching Authority dated May 14, 2025 in Application No. PCT/US2025/019979.
International Search Report dated May 14, 2025 in Application No. PCT/US2025/019979.
Communication dated May 14, 2025 in Application No. PCT/US2025/019979.

* cited by examiner

*Primary Examiner* — Mark Villena
(74) *Attorney, Agent, or Firm* — Sughrue Mion, PLLC

(57) ABSTRACT

A method performed by at least one processor includes receiving an output microphone signal generated by a non-directional microphone, the output signal comprising a user voice signal and mixture signal comprising an audio playback signal and a voice reference signal of the user voice, the mixture signal output from a loudspeaker; inputting the output microphone signal and the voice reference signal into a first Kalman filter to generate a first filtered signal; inputting the output signal and the audio playback signal into a second Kalman filter to generate a second filtered signal; estimating the user voice signal by subtracting the first filtered signal and the second filtered signal from the output microphone signal to generate a voice estimation signal of the user voice; and outputting, via the loudspeaker, the voice estimation signal.

20 Claims, 5 Drawing Sheets

DUAL-FILTER KALMAN METHOD FOR ACOUSTIC FEEDBACK CANCELLATION IN HANDS-FREE KARAOKE ENVIRONMENTS

FIELD

The disclosure generally relates to dual-filter Kalman method for acoustic feedback cancellation in hands-free karaoke environments.

BACKGROUND

Hands-free karaoke systems represent a modern evolution in the world of recreational singing, where users can perform without the need to hold microphones. These systems typically use mounted or embedded microphones in the environment or wearable microphones to capture the singer's voice. This setup allows for a more immersive and interactive singing experience, providing users with the freedom to engage more with the audience and use expressive gestures without being encumbered by a handheld microphone. While hands-free karaoke systems offer significant advantages by enhancing performer mobility and interaction, they introduce specific challenges related to audio quality, system complexity.

Capturing clear audio can be more challenging in hands-free setups, especially in noisy environments. Since the microphone is not held close to the mouth, the system needs to effectively isolate the singer's voice from reverberation, background noise, and music playback. Without the directional control offered by handheld microphones, there is an increased risk of feedback and echo, which can degrade sound quality. Managing these effectively requires sophisticated audio processing technologies.

The system needs advanced signal processing algorithms to handle the separation of vocals from playback vocals and music. This complexity increases with the need for real-time processing to reduce latency, which is crucial for live performance settings. Overcoming these challenges involves sophisticated audio processing solutions and careful system design to ensure that the benefits of hands-free performance can be fully realized without compromising on the quality of the karaoke experience.

SUMMARY

According to an aspect of the disclosure, a method performed by at least one processor comprises: receiving an output microphone signal generated by a non-directional microphone, the output signal comprising a user voice signal and mixture signal comprising an audio playback signal and a voice reference signal of the user voice, the mixture signal output from a loudspeaker; inputting the output microphone signal and the voice reference signal into a first Kalman filter to generate a first filtered signal; inputting the output signal and the audio playback signal into a second Kalman filter to generate a second filtered signal; estimating the user voice signal by subtracting the first filtered signal and the second filtered signal from the output microphone signal to generate a voice estimation signal of the user voice; and outputting, via the loudspeaker, the voice estimation signal.

According to an aspect of the disclosure, an apparatus comprises: at least one memory configured to store program code; and at least one processor configured to read the program code and operate as instructed by the program code, the program code including: receiving code configured to cause the at least one processor to receive an output microphone signal generated by a non-directional microphone, the output signal comprising a user voice signal and mixture signal comprising an audio playback signal and a voice reference signal of the user voice, the mixture signal output from a loudspeaker; first inputting code configured to cause the at least one processor to input the output microphone signal and the voice reference signal into a first Kalman filter to generate a first filtered signal; second inputting code configured to cause the at least one processor to input the output signal and the audio playback signal into a second Kalman filter to generate a second filtered signal; estimating code configured to cause the at least one processor to estimate the user voice signal by subtracting the first filtered signal and the second filtered signal from the output microphone signal to generate a voice estimation signal of the user voice; and outputting code configured to cause the at least one processor to output, via the loudspeaker, the voice estimation signal.

According to an aspect of the disclosure, a non-transitory computer readable medium, having instructions stored therein, which when executed by a processor cause the processor to execute a method comprising: receiving an output microphone signal generated by a non-directional microphone, the output signal comprising a user voice signal and mixture signal comprising an audio playback signal and a voice reference signal of the user voice, the mixture signal output from a loudspeaker; inputting the output microphone signal and the voice reference signal into a first Kalman filter to generate a first filtered signal; inputting the output signal and the audio playback signal into a second Kalman filter to generate a second filtered signal; estimating the user voice signal by subtracting the first filtered signal and the second filtered signal from the output microphone signal to generate a voice estimation signal of the user voice; and outputting, via the loudspeaker, the voice estimation signal.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
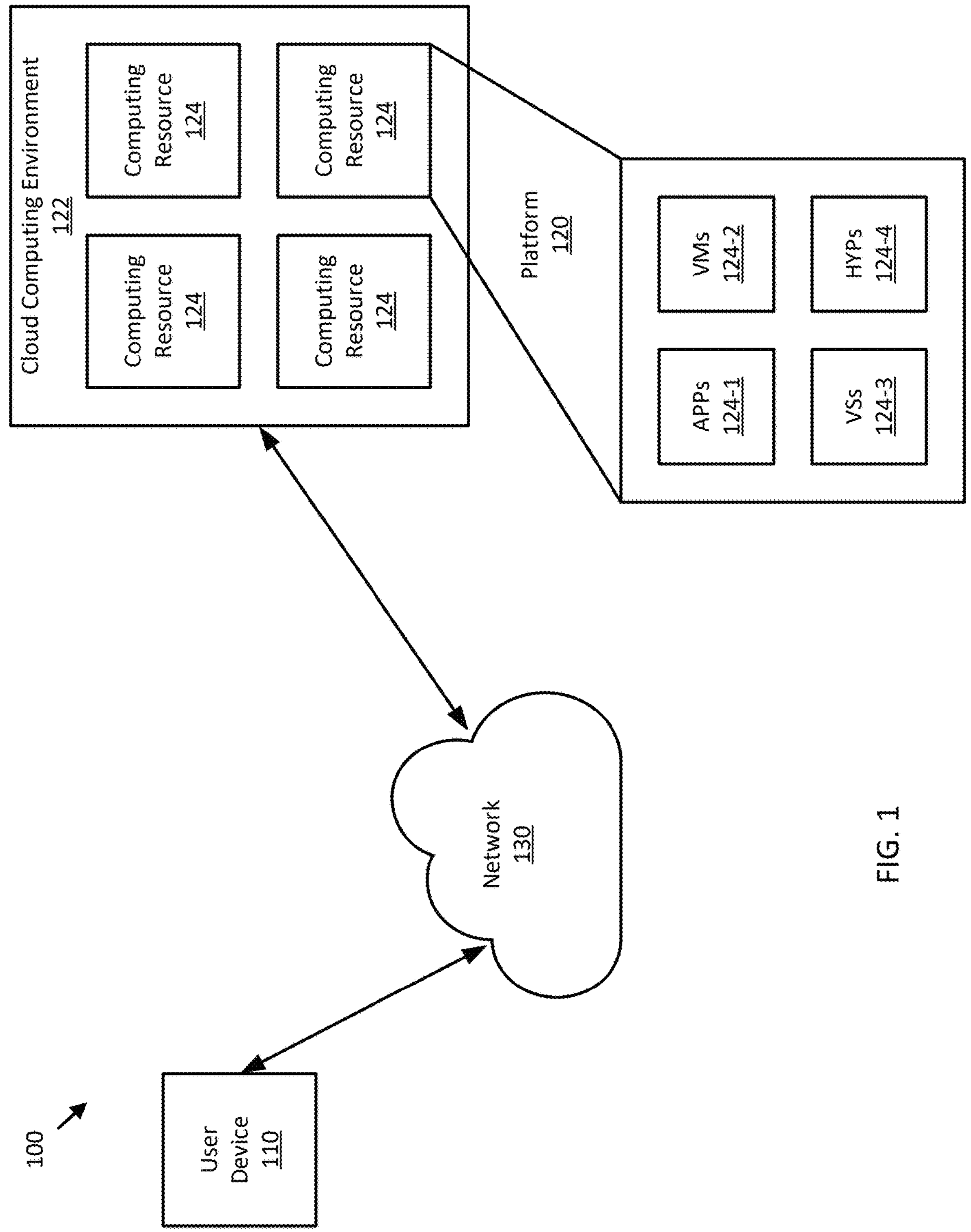
FIG. 1 is a diagram of an environment in which methods, apparatuses, and systems described herein may be implemented, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Embodiments of the present disclosure are directed to audio signal processing, specifically to adaptive filtering techniques used in audio systems. More particularly, the embodiments of the present disclosure relate to a dual-filter Kalman method designed for use in hands-free karaoke systems to enhance audio quality by separately processing and controlling playback vocals and music components. The embodiments of the present disclosure involve dynamic adaptation of filter parameters based on the energy ratios of the audio signals, thereby improving sound separation and overall acoustic performance in entertainment and consumer electronic products.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSS) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
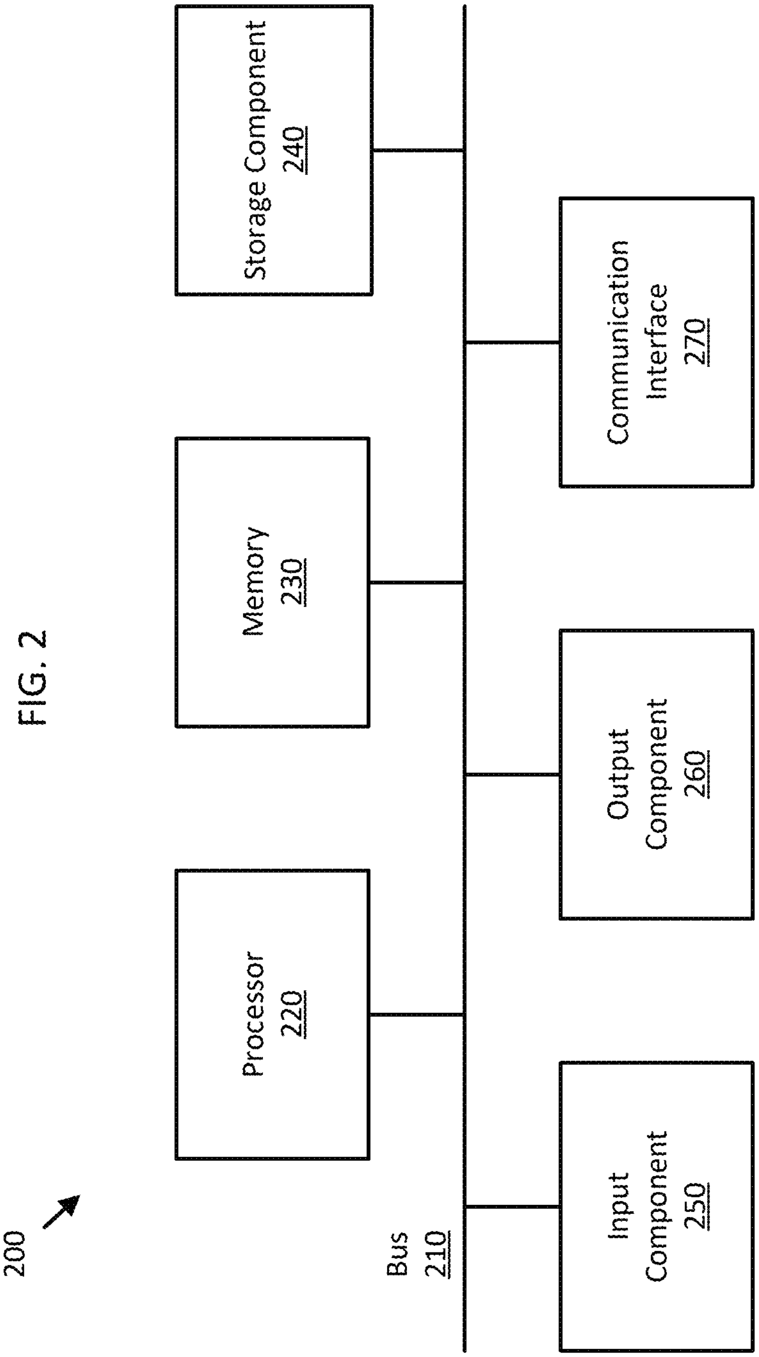
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

The Kalman filter is a powerful algorithm used for estimating the state of a linear dynamic system from a series of noisy measurements. In the context of audio processing, a filter Kalman filter can be employed to reduce noise and feedback, enhancing the sound quality by estimating and correcting the signal in real-time. The filter continuously updates its estimates based on incoming noisy data and a prediction model, striving to minimize the mean of the squared error between the estimated and actual states.

While the single-filter Kalman filter is beneficial for general noise reduction and signal correction, its limitations in handling multiple, complex audio streams simultaneously make it less ideal for sophisticated applications like hands-free karaoke systems. A single filter setup typically processes one combined audio signal, which may include both vocals and music. This integration can lead to suboptimal suppression of unwanted noise or feedback as the filter cannot distinctly manage the complex individual characteristics of multiple audio sources.

The challenges of operating in dynamic and acoustically complex karaoke environments, coupled with the limitations of single-channel Kalman filters in effectively managing multiple audio sources and adapting to rapid changes, highlight the need for more advanced audio processing solutions. Multi-channel or dual-filter systems, enhanced adaptability features, and more sophisticated noise and feedback suppression mechanisms are necessary to address these challenges effectively and meet user expectations for high-quality karaoke experiences.

The embodiments of the present disclosure introduce an innovative dual-filter Kalman system specifically developed to address and enhance audio processing in hands-free karaoke systems. Traditional single-filter approaches often struggle with the simultaneous management of multiple audio streams, such as music and vocals, which can lead to suboptimal suppression of unwanted noise and feedback. The embodiments of the present disclosure overcome these limitations by implementing two distinct Kalman filters that separately estimate and process the playback vocal and music components, significantly improving the clarity and quality of the audio output.

According to one or more embodiments, each filter in the dual-filter system is uniquely tuned to either the vocal or music components, using real-time measurements of the energy ratios between these two audio streams to dynamically adjust the transition factors of the filters. This dynamic weighting of the transition factors not only enhances the accuracy and effectiveness of each filter but also increases the robustness of the system against variations in audio input levels and types.

Experimental results demonstrate that the proposed dual-filter Kalman method systematically outperforms traditional single-filter Kalman approaches in terms of audio clarity and noise suppression. The dynamic adjustment of the transition factors based on energy ratios further strengthens the system's ability to maintain high-quality audio even in challenging acoustic environments. This makes the embodiments of the present disclosure suited for karaoke systems, where the separation of music and vocal tracks is critical for user satisfaction and performance.

The embodiments of the present disclosure are is ideal for integration into consumer electronics that benefit from advanced audio processing capabilities, such as karaoke machines, home entertainment systems, and professional audio setups, offering users an enhanced interactive audio experience with minimized feedback and maximized audio fidelity. However, as understood by one of ordinary skill in the art, the embodiments of the present disclosure are not limited to karaoke systems and may be applied to any system that inputs a user voice and an additional sound source.

Figure 3:
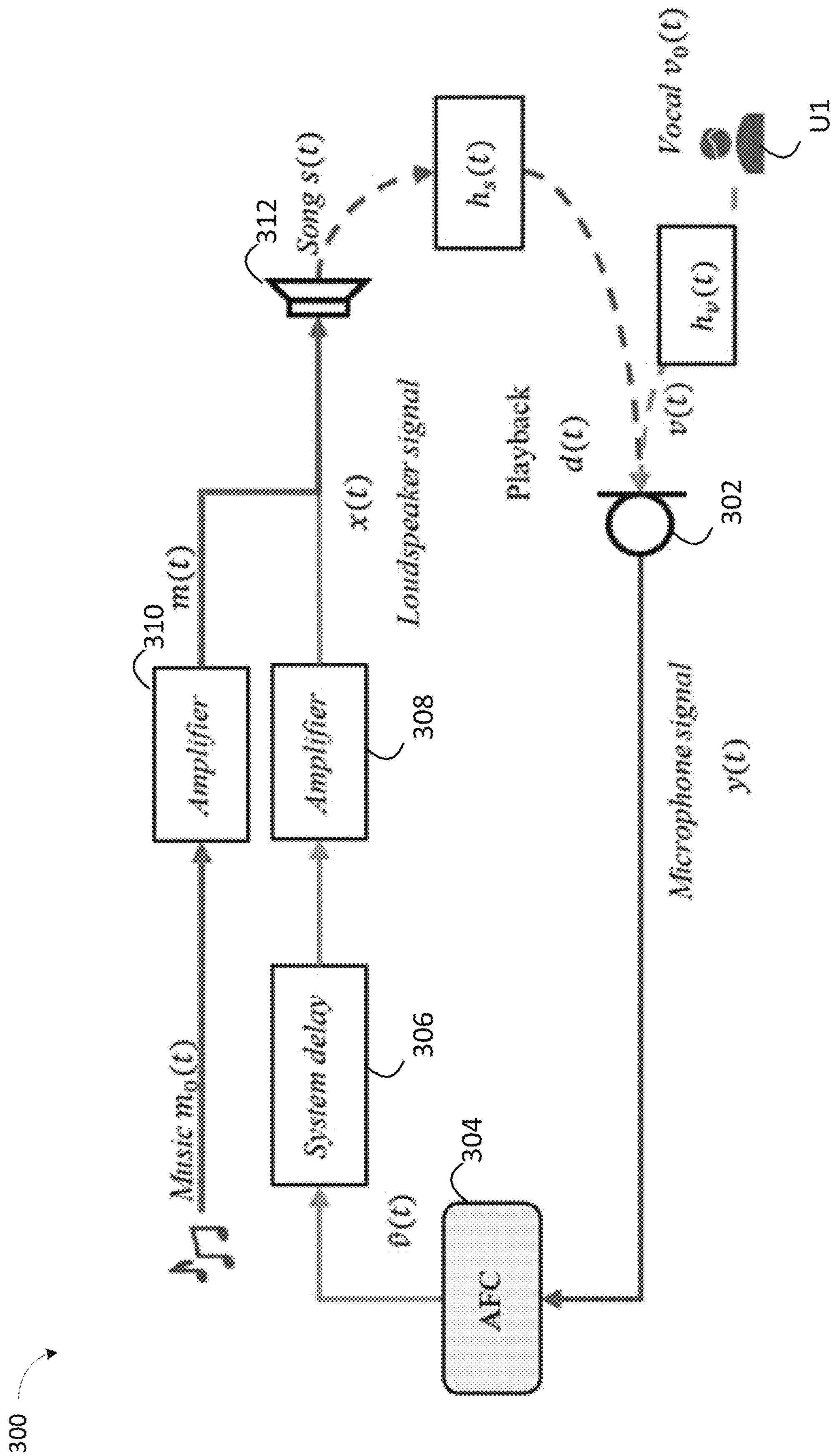
FIG. 3 is an illustration of an example hands-free karaoke system, according to embodiments.

FIG. 3 illustrates an example hands-free karaoke system 300, where a microphone 302 picks up not only the vocals of the singer, but also the playback song d(t):

$$y(t) = v(t) + d(t), \qquad \text{Eq. (1)}$$

Where $$v(t) = v_0(t) * h_v(t) \qquad \text{Eq. (2)}$$

$$d(t) = s(t) * h_s(t)$$

In one or more examples, $v_0(t)$ is the source vocal from the singer/user and s(t) is the song played out by the loudspeaker. The models $h_v(t)$, $h_s(t)$ denote the acoustic paths from the singer/user U1 and the loudspeaker 312 to the microphone 302. In one or more examples, the song signal is a mixture of the background music m(t) and vocal sent to loudspeaker x(t). If not processed properly, the vocal picked up by microphone will be played back and picked up again by the microphone, resulting in an acoustic loop and recursively amplifying of the vocal signal. This system disadvantageously results in acoustic howling, which is unpleasant to listen to and may affect the users' auditory health and be harmful to the device.

To guarantee an optimal user experience, it is required that the x(t) should be an estimate of the target vocal signal with the playback vocal and playback music components in the microphone recording cancelled out. Techniques like adaptive feedback cancellation (AFC) 304 is usually utilized to address this problem. AFC 304 takes the microphone signal as input to estimate the playback signal, then subtract it from the microphone signal to get an estimate of the vocal signal, denoted as $\hat{v}(t)$. This estimate is then sent through the system with system delay 306 introduced, and sent to the microphone for amplification 308. The music may be amplified by amplifier 310. The corresponding loudspeaker signal is:

$$x(t) = m(t) + [\hat{v}(t-\Delta t)\cdot G], \quad \text{Eq. (3)}$$

where G is the loudspeaker gain 308 and Δt denotes the delay 306 between the microphone and the loudspeaker introduced by the system.

Frequency-domain Kalman filter (FDKF) based AFC estimates the feedback signal by modeling the acoustic path with an adaptive filter W (k) (k denotes the frame index). FDKF can be understood as a two-step process, where the iterative feedback from these steps drives the update of filter weights.

In the prediction step, the target vocal signal V(k) is estimated by the measurement equation:

$$\hat{V}(k) = Y(k) - X(k)\hat{W}(k), \quad \text{Eq. (4)}$$

where $\hat{V}$(k), Y(k), and X(k) are the short-time Fourier transform (STFT) of the estimated target signal, microphone, and reference signal respectively. Note that in traditional Kalman filter, we utilize loudspeaker signal X(k) as the reference signal. $\hat{W}$(k) denotes the estimated echo path in the frequency domain. Finally, inverse STFT is applied on $\hat{V}$(k) to obtain the time-domain $\hat{v}$(t).

In one or more examples, in the update step, the state equation for updating acoustic path $\hat{W}$(k) is defined as:

$$\hat{W}(k+1) = A\left[\hat{W}(k) + K(k)\hat{V}(k)\right], \quad \text{Eq. (5)}$$

where A is the transition factor. K(k) denotes the Kalman gain. As shown in FIG. 2(*a*), K(k) is related to the reference signal X(k), echo path $\hat{W}$(k−1) and estimated vocal signal $\hat{V}$(k−1).

In one or more examples, the calculation of K(k) is defined as:

$$K(k) = P(k)X^H(k)\left[X(k)P(k)X^H(k) + \Psi_{vv}(k)\right]^{-1} \quad \text{Eq. (6)}$$

$$P(k+1) = A^2\left[I - \frac{1}{2}K(k)X(k)\right]P(k) + \Psi_{\Delta\Delta}(k), \quad \text{Eq. (7)}$$

where P(k) is the state estimation error covariance. $\Psi_{vv}$(k) and $\Psi_{\Delta\Delta}$(k) are observation noise covariance and process noise covariance respectively and are approximated by the covariance of the estimated near-end signal $\Psi_{\hat{s}\hat{s}}$(k) and the echo-path $\Psi_{\hat{W}\hat{W}}$(k), respectively, in traditional Kalman filter:

$$\Psi_{vv}(k+1) = 0.9\Psi_{vv}(k) + 0.1\left|\hat{V}(k)\right|^2 \quad \text{Eq. (8)}$$

$$\Psi_{\Delta\Delta}(k+1) = 0.9\Psi_{\Delta\Delta}(k) + 0.1(1-A^2)\left|\hat{W}(k)\right|^2 \quad \text{Eq. (9)}$$

Traditional Kalman filters for Adaptive Feedback Cancellation (AFC) in hands-free karaoke systems treat the playback signal d(t), which contains both playback music and playback vocal, as an integrated signal and estimate it directly using the loudspeaker signal x(t) as a reference signal. This approach lacks flexibility in suppressing playback vocal and playback music, potentially resulting in strong leakage. Given that we have access to both the music and an estimate of the vocal, which can be used as separate reference signals during filter adaptation, this invention proposes a dual-filter Kalman (DF_Kalman) design to address the AFC problem.

The embodiments of the present disclosure use of two filters during adaptation, rather than treating the playback signal d(t) as a single signal. In one or more examples, the signals m(t) and [$\hat{v}$(t−Δt)·G], as shown in Eq. (3), may be used as individual reference signals for estimating the playback music and playback vocal components in d(t). In one or more examples, the two filters are updated using the same error signal. This approach allows for a more accurate estimation of the playback components and optimal cancellation of both playback signals.

Figure 4:
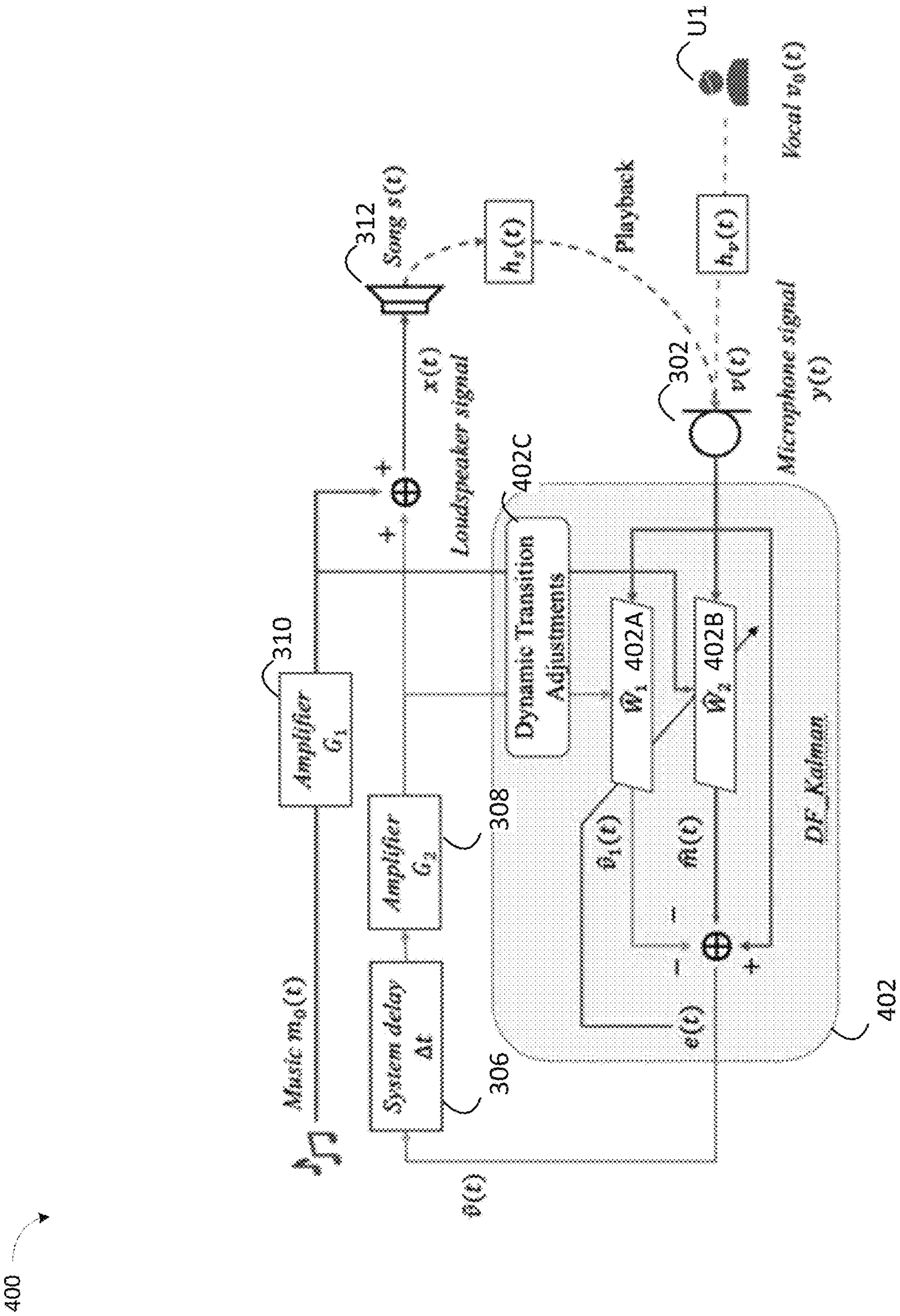
FIG. 4 is an illustration of an example system that implements a dual-Kalman filter, according to embodiments.

FIG. 4 illustrates an example system 400 that includes a DF_Kalman 402. The DF_Kalman includes a first Kalman filter 402A and a second Kalman filter 402B. Compared to the traditional FDKF, the DF_Kalman proposed in this invention has the following key modifications. For example, the first Kalman filter 402A may receive a voice reference signal and an output of the microphone 302, and the second Kalman filter 402 may receive an audio playback signal (e.g., music reference signal) and the output of the microphone 302. The weights of the filters may be adjusted in accordance with dynamic transition adjustments 402C and an error signal e(t).

In one or more examples, two filters for estimating the playback music and playback vocal separately. In the prediction step, equation (4) is modified as:

$$\hat{V}(k) = Y(k) - V'(k)\widehat{W_1}(k) - M(k)\widehat{W_2}(k), \quad \text{Eq. (10)}$$

Where V'(k) and M(k) are the two reference signals, and v'(t) in the time domain is expressed as:

$$v'(t) = \hat{v}(t-\Delta t)\cdot G \quad \text{Eq. (11)}$$

In one or more examples, in the update step, the state equation for updating the filters $\widehat{W_1}$(k) and $\widehat{W_2}$(k) are defined as:

$$\widehat{W_1}(k+1) = A\left[\widehat{W_1}(k) + K_1(k)\hat{V}(k)\right] \quad \text{Eq. (12)}$$

$$\widehat{W_2}(k+1) = A\left[\widehat{W_2}(k) + K_2(k)\hat{V}(k)\right] \quad \text{Eq. (13)}$$

In one or more examples, the transition factor A controls the variation characteristics of the filters. In one or more examples, the same A may be used for updating the two filters. However, considering that the characteristics of playback music and playback vocal could be different, different transition factors may be used during filter updating. Through exploration and comparison, it was determined that the same A may be used for updating $\widehat{W_1}$(k) and $\widehat{W_2}$(k), but different transition factors may be used for updating P(k), as shown in equation Eq. (7), gives us the best performance.

In one or more examples, to determine the values to be used in the updating of $P_1(k)$ and $P_2(k)$, the energy ratio between the two reference signals may be determined as:

$$\text{ratio} = \frac{|V'|^2}{|M|^2 + |V'|^2} \quad \text{Eq. (14)}$$

In one or more examples, the main idea of dynamic transition adjustment is that if the energy of one reference is more dominant, more attention needs to be put for updating the corresponding filter, e.g., increasing the value of the corresponding transition factor. Based on this, the transition factors during updating of $P_1(k)$ and $P_2(k)$ may be determined as follows:

$$A_1 = A + (1 - A)\cdot\text{ratio} \quad \text{Eq. (15)}$$

$$A_2 = A + (1 - A)\cdot(1 - \text{ratio}) \quad \text{Eq. (16)}$$

In one or more examples, the updating of K(k) and P(k) in Eqs. (6) and (7) are modified as:

$$K_1(k) = P_1(k)V'^H(k)\left[V'(k)P_1(k)V'^H(k) + \Psi_{vv}(k)\right]^{-1} \quad \text{Eq. (17)}$$

$$P_1(k+1) = A_1^2\left[I - \frac{1}{2}K_1(k)V'(k)\right]P_1(k) + \Psi_{\Delta\Delta 1}(k) \quad \text{Eq. (18)}$$

$$K_2(k) = P_2(k)M^H(k)\left[M(k)P_2(k)M^H(k) + \Psi_{vv}(k)\right]^{-1} \quad \text{Eq. (19)}$$

$$P_2(k+1) = A_2^2\left[I - \frac{1}{2}K_2(k)M(k)\right]P_2(k) + \Psi_{\Delta\Delta 2}(k) \quad \text{Eq. (20)}$$

In the above equations, $\Psi_{vv}(k)$ is still obtained as that shown in equation (9), while:

$$\Psi_{\Delta\Delta 1}(k+1) = 0.9\Psi_{\Delta\Delta 1}(k) + 0.1\left(1 - A_1^2\right)|\hat{W}_1(k)|^2 \quad \text{Eq. (21)}$$

$$\Psi_{\Delta\Delta 2}(k+1) = 0.9\Psi_{\Delta\Delta 2}(k) + 0.1\left(1 - A_2^2\right)|\hat{W}_2(k)|^2 \quad \text{Eq. (22)}$$

Using a dual-filter Kalman method in a hands-free karaoke system offers several significant advantages that enhance the audio experience for users. The dual-filter approach allows for more precise separation of different audio streams, such as playback vocals and music. Each filter is specifically tuned to target and suppress either the music or vocal components, leading to cleaner and clearer audio output. By separately processing the vocals and music, the system can more effectively reduce noise and feedback for each component. This results in a reduction of unwanted echoes and reverberations that can detract from the karaoke experience. The dual-filter system adapts dynamically to changes in the audio environment. By measuring the energy ratios of the two audio streams, the system can adjust the transition factors of each filter accordingly. This dynamic weighting helps maintain optimal performance even with varying song dynamics and user input levels. The use of separate filters enhances the robustness of the system against fluctuations in sound quality due to changes in audio input. This is particularly beneficial in live settings where ambient noise levels and the balance between music and vocals can frequently change. Overall, the dual-filter Kalman method provides superior audio quality compared to single-filter systems. This method systematically outperforms traditional methods by ensuring that each audio component is processed with tailored settings, maintaining the integrity and quality of the original sound. With better sound separation and noise suppression, users enjoy a more immersive and enjoyable karaoke experience, free from common disturbances like feedback and muffled playback sounds.

Figure 5:
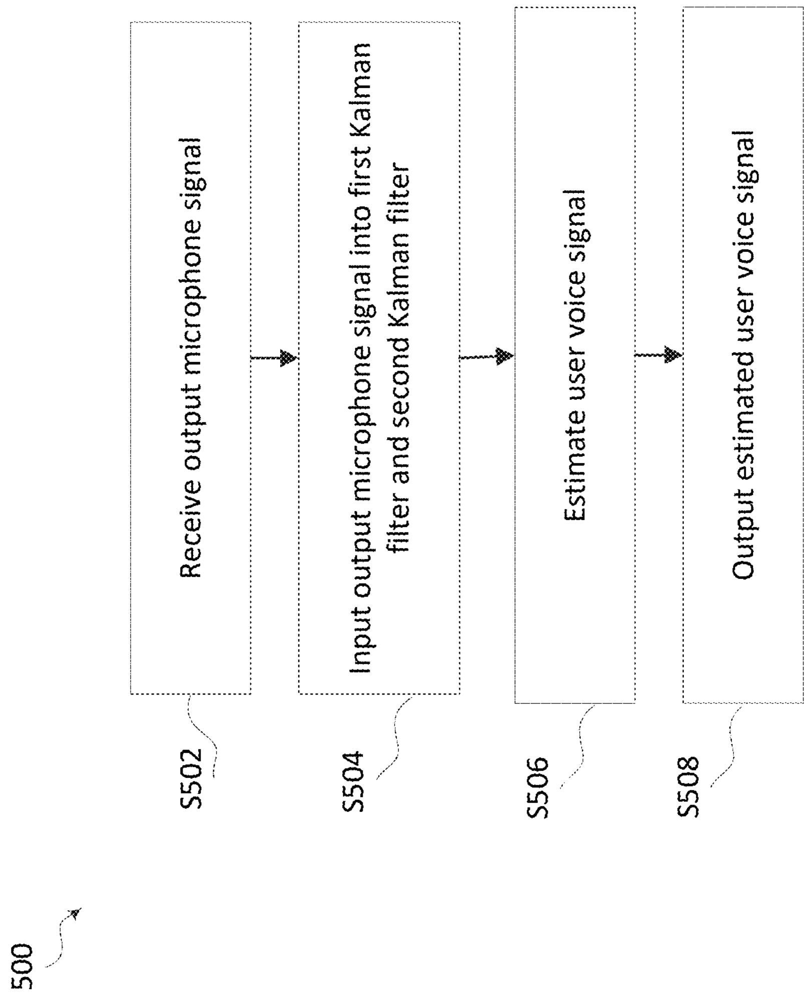
FIG. 5 is a flowchart for performing a dual-Kalman filtering method, according to embodiments.

FIG. 5 illustrates a flowchart of an example process 500 of implementing the DF_Kalman. For example, the process 500 may be implemented by the processor 220 (FIG. 2) using system 400 (FIG. 4).

The process may start at operation S502 where an output microphone signal is received. In one or more examples, the output microphone signal may be a signal from microphone 302. The output microphone signal may comprise a voice signal of the user U1 and a mixture signal that comprises an audio playback signal (e.g., $m_o(t)$*G1), and a voice reference signal (e.g., Eq. (11)).

The process proceeds to operation S504 where the output microphone signal is input into a first Kalman filter and a second Kalman filter. For example, the voice reference signal and output microphone signal may be input into first Kalman filter 402A, and the audio playback signal and the output microphone signal may be put into second Kalman filter 402B. The first Kalman filter 402A may generate a first filter signal, and the second Kalman filter 402B may generate a second filter signal.

The process proceeds to operation S506, where a user voice signal is estimated. For example, the user voice signal may be estimated in accordance with Eq. (10).

The process proceeds to operation S508, where the estimated user voice signal is output. For example, the estimated user voice signal may be output to the loudspeaker 312.

The proposed methods disclosed herein may be implemented by processing circuitry (e.g., one or more processors or one or more integrated circuits). In one example, the one or more processors execute a program that is stored in a non-transitory computer-readable medium to perform one or more of the proposed methods.

The techniques described above may be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method performed by at least one processor comprises:

receiving an output microphone signal generated by a non-directional microphone, the output microphone signal comprising a user voice signal and a mixture signal comprising an audio playback signal and a voice reference signal of the user voice, the mixture signal output from a loudspeaker;

inputting the output microphone signal and the voice reference signal into a first Kalman filter to generate a first filtered signal;

inputting the output microphone signal and the audio playback signal into a second Kalman filter to generate a second filtered signal;

estimating the user voice signal by subtracting the first filtered signal and the second filtered signal from the output microphone signal to generate a voice estimation signal of the user voice; and outputting, via the loudspeaker, the voice estimation signal.

2. The method according to claim 1, wherein the voice reference signal comprises a prior voice estimation signal delayed by a system delay and multiplied by an amplifier gain.

3. The method according to claim 1, further comprising:

updating the first Kalman filter and the second Kalman filter based on the second estimation signal.

4. The method according to claim 3, wherein the updating the first Kalman filter and the second Kalman filter further comprises:

determining a ratio between the voice reference signal squared and a sum of the audio playback signal squared and the voice reference signal squared.

5. The method according to claim 4, wherein the updating the first Kalman filter and the second Kalman filter further comprises:

determining a first transition factor of the first Kalman filter based on a sum of a global transition factor and the ratio multiplied by one minus the global transition factor; and determining a second transition factor of the second Kalman filter based on a sum of the global transition factor and multiplication of one minus the global transition factor and one minus the ratio.

6. The method according to claim 5, wherein the updating the first Kalman filter and the second Kalman filter further comprises:

updating a first gain of the first Kalman filter and a first state estimation error covariance of the first filter based on the first transition factor; and updating a second gain of the second Kalman filter and a second state estimation covariance of the second Kalman filter based on the second transition factor.

7. The method according to claim 1, wherein the non-direction microphone is a hands free microphone.

8. An apparatus comprising:

at least one memory configured to store program code; and at least one processor configured to read the program code and operate as instructed by the program code, the program code including:

receiving code configured to cause the at least one processor to receive an output microphone signal generated by a non-directional microphone, the output microphone signal comprising a user voice signal and a mixture signal comprising an audio playback signal and a voice reference signal of the user voice, the mixture signal output from a loudspeaker;

first inputting code configured to cause the at least one processor to input the output microphone signal and the voice reference signal into a first Kalman filter to generate a first filtered signal;

second inputting code configured to cause the at least one processor to input the output microphone signal and the audio playback signal into a second Kalman filter to generate a second filtered signal;

estimating code configured to cause the at least one processor to estimate the user voice signal by subtracting the first filtered signal and the second filtered signal from the output microphone signal to generate a voice estimation signal of the user voice; and outputting code configured to cause the at least one processor to output, via the loudspeaker, the voice estimation signal.

9. The apparatus according to claim 8, wherein the voice reference signal comprises a prior voice estimation signal delayed by a system delay and multiplied by an amplifier gain.

10. The apparatus according to claim 8, wherein the program code further comprises:

updating code configured to cause the at least one processor to update the first Kalman filter and the second Kalman filter based on the second estimation signal.

11. The apparatus according to claim 10, wherein the updating code further comprises:

first determining code configured to cause the at least one processor to determine a ratio between the voice reference signal squared and a sum of the audio playback signal squared and the voice reference signal squared.

12. The apparatus according to claim 11, wherein the updating code further comprises:

second determining code configured to cause the at least one processor to determine a first transition factor of the first Kalman filter based on a sum of a global transition factor and the ratio multiplied by one minus the global transition factor; and third determining code configured to cause the at least one processor to determine a second transition factor of the second Kalman filter based on a sum of the global transition factor and multiplication of one minus the global transition factor and one minus the ratio.

13. The apparatus according to claim 12, wherein the updating code further comprises:

first filter updating code configured to cause the at least one processor to update a first gain of the first Kalman filter and a first state estimation error covariance of the first filter based on the first transition factor; and second filter updating code configured to cause the at least one processor to update a second gain of the second Kalman filter and a second state estimation covariance of the second Kalman filter based on the second transition factor.

14. The apparatus according to claim 8, wherein the non-direction microphone is a hands free microphone.

15. A non-transitory computer readable medium, having instructions stored therein, which when executed by a processor cause the processor to execute a method comprising:

receiving an output microphone signal generated by a non-directional microphone, the output microphone signal comprising a user voice signal and a mixture signal comprising an audio playback signal and a voice reference signal of the user voice, the mixture signal output from a loudspeaker;

inputting the output microphone signal and the voice reference signal into a first Kalman filter to generate a first filtered signal;

inputting the output microphone signal and the audio playback signal into a second Kalman filter to generate a second filtered signal;

estimating the user voice signal by subtracting the first filtered signal and the second filtered signal from the output microphone signal to generate a voice estimation signal of the user voice; and outputting, via the loudspeaker, the voice estimation signal.

16. The non-transitory computer readable medium according to claim 15, wherein the voice reference signal comprises a prior voice estimation signal delayed by a system delay and multiplied by an amplifier gain.

17. The non-transitory computer readable medium according to claim 15, further comprising:

updating the first Kalman filter and the second Kalman filter based on the second estimation signal.

18. The non-transitory computer readable medium according to claim 17, wherein the updating the first Kalman filter and the second Kalman filter further comprises:

determining a ratio between the voice reference signal squared and a sum of the audio playback signal squared and the voice reference signal squared.

19. The non-transitory computer readable medium according to claim 18, wherein the updating the first Kalman filter and the second Kalman filter further comprises: determining a first transition factor of the first Kalman filter based on a sum of a global transition factor and the ratio multiplied by one minus the global transition factor; and determining a second transition factor of the second Kalman filter based on a sum of the global transition factor and multiplication of one minus the global transition factor and one minus the ratio.

20. The non-transitory computer readable medium according to claim 19, wherein the updating the first Kalman filter and the second Kalman filter further comprises:

updating a first gain of the first Kalman filter and a first state estimation error covariance of the first filter based on the first transition factor; and updating a second gain of the second Kalman filter and a second state estimation covariance of the second Kalman filter based on the second transition factor.

* * * * *